United States Patent
Zhang et al.

(10) Patent No.: US 11,226,935 B2
(45) Date of Patent: Jan. 18, 2022

(54) METHOD, DEVICE AND COMPUTER PROGRAM PRODUCT FOR DETERMINING DUPLICATED DATA

(71) Applicant: EMC IP Holding Company LLC, Hopkinton, MA (US)

(72) Inventors: Ming Zhang, Beijing (CN); Chen Gong, Beijing (CN); Shuo Lv, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 307 days.

(21) Appl. No.: 16/359,445

(22) Filed: Mar. 20, 2019

(65) Prior Publication Data

US 2019/0332583 A1 Oct. 31, 2019

(30) Foreign Application Priority Data

Apr. 28, 2018 (CN) .......................... 201810398251.8

(51) Int. Cl.
| | | |
|---|---|---|
| *G06F 16/10* | (2019.01) | |
| *G06F 16/174* | (2019.01) | |
| *G06K 9/62* | (2006.01) | |
| *G06F 16/901* | (2019.01) | |
| *G06F 16/9035* | (2019.01) | |

(52) U.S. Cl.
CPC ........ *G06F 16/1748* (2019.01); *G06F 16/901* (2019.01); *G06F 16/9035* (2019.01); *G06K 9/6201* (2013.01); *G06K 9/6227* (2013.01); *G06K 9/6231* (2013.01)

(58) Field of Classification Search
None
See application file for complete search history.

(56) References Cited

U.S. PATENT DOCUMENTS

| | | | | |
|---|---|---|---|---|
| 6,547,829 | B1* | 4/2003 | Meyerzon | G06F 16/951 715/234 |
| 6,658,423 | B1* | 12/2003 | Pugh | G06F 16/355 |
| 7,685,090 | B2* | 3/2010 | Chaudhuri | G06F 16/215 707/999.001 |
| 8,140,505 | B1* | 3/2012 | Jain | G06F 16/9014 707/706 |
| 8,484,356 | B1 | 7/2013 | Frederick et al. | |
| 8,554,918 | B1 | 10/2013 | Frederick | |
| 8,756,249 | B1 | 6/2014 | Grant et al. | |
| 8,825,626 | B1* | 9/2014 | Wallace | G06F 16/904 707/709 |
| 9,141,554 | B1* | 9/2015 | Candelaria | H03M 7/3091 |
| 9,436,292 | B1 | 9/2016 | Frederick et al. | |
| 9,875,163 | B1 | 1/2018 | Frederick et al. | |
| 10,318,387 | B1 | 6/2019 | Shelesh et al. | |

(Continued)

*Primary Examiner* — Belix M Ortiz Ditren
(74) *Attorney, Agent, or Firm* — BainwoodHuang

(57) ABSTRACT

Technique determine (or detect) duplicated data. The techniques involve: in response to determining that data at a first position in input data is the same as predetermined data, determining a feature value of a selected portion of input data; determining whether the feature value matches with a pre-stored duplicated data pattern in a duplicated data pattern list; and in response to determining that the feature value matches with the duplicated data pattern, determining an association of the input data with reference data which is associated with the matched pattern.

10 Claims, 5 Drawing Sheets

(56) References Cited

U.S. PATENT DOCUMENTS

| | | |
|---|---|---|
| 10,496,322 B2 | 12/2019 | Dalmatov |
| 2009/0234855 A1* | 9/2009 | Hirsch ................ G06F 16/2255 |
| 2012/0059827 A1* | 3/2012 | Brittain ................ G06F 16/215 |
| | | 707/741 |

* cited by examiner

METHOD, DEVICE AND COMPUTER PROGRAM PRODUCT FOR DETERMINING DUPLICATED DATA

CROSS-REFERENCE TO RELATED APPLICATION(S)

This application claims priority to Chinese Patent Application No. CN201810398251.8, on file at the China National Intellectual Property Administration (CNIPA), having a filing date of Apr. 28, 2018, and having "METHOD, DEVICE AND COMPUTER PROGRAM PRODUCT FOR DETERMINING DUPLICATE DATA" as a title, the contents and teachings of which are herein incorporated by reference in their entirety.

FIELD

The present disclosure relates to recognition and determination of data of a predetermined pattern, and more specifically to a method, a device and a computer program product for determining duplicated data.

BACKGROUND

The current Internet is filled with a lot of duplicated data. Processing and recording of these duplicated webpage data cause waste of storage and calculation resources. Therefore, it is necessary to recognize these duplicated data.

A conventional method of recognizing or determining duplicated data is to compare to-be-recognized input data directly with reference data of duplicated data of an already-existing pattern cache line by cache line to determine whether the two are the same. Since the conventional method of determining the duplicated data needs to compare each input data with a plurality of reference data of a corresponding already-existing pattern in a database as per cache line, the conventional method of determining the duplicated data has drawbacks such as a lower recognition efficiency and consumption of a lot of CPU resources.

SUMMARY

The subject matter described herein provides a method, a device and a computer program product for determining (or detecting) duplicated data, which can effectively reduce consumption of storage (e.g., via compression, deduplication, etc.) and computing resources and improve the efficiency of recognizing the duplicated data.

According to a first aspect of the present disclosure, there is provided a method of determining duplicated data. The method includes: in response to determining that data at a first position in input data is the same as predetermined data, determining a feature value of a selected portion of input data; determining whether the feature value matches with a pre-stored duplicated data pattern in a duplicated data pattern list; and in response to determining that the feature value matches with the duplicated data pattern, determining an association of the input data with reference data which is associated by the matched pattern.

According to a second aspect of the present disclosure, there is provided an apparatus for determining duplicated data. The apparatus includes: a memory configured to store one or more programs; a processing unit coupled to the memory and configured to execute one or more programs to cause the apparatus to perform acts including: determining a feature value of a selected portion of input data in response to determining data at a first position in input data is the same as predetermined data; determining whether the feature value matches with a pre-stored duplicated data pattern in a duplicated data pattern list; and in response to determining that the feature value matches with the duplicated data pattern, determining an association of the input data with reference data which is associated by the matched pattern.

According to a third aspect of the present disclosure, there is provided a computer program product. The computer program product being tangibly stored on a non-transient computer readable medium and includes machine executable instructions, the machine executable instructions, when being executed, causing a machine to perform steps of the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objects, features and advantages of the present disclosure will be made more apparent by describing example embodiments of the present disclosure in more detail with reference to figures, wherein identical reference signs represent identical parts in the example embodiments of the present disclosure.

DETAILED DESCRIPTION

Figure 1:
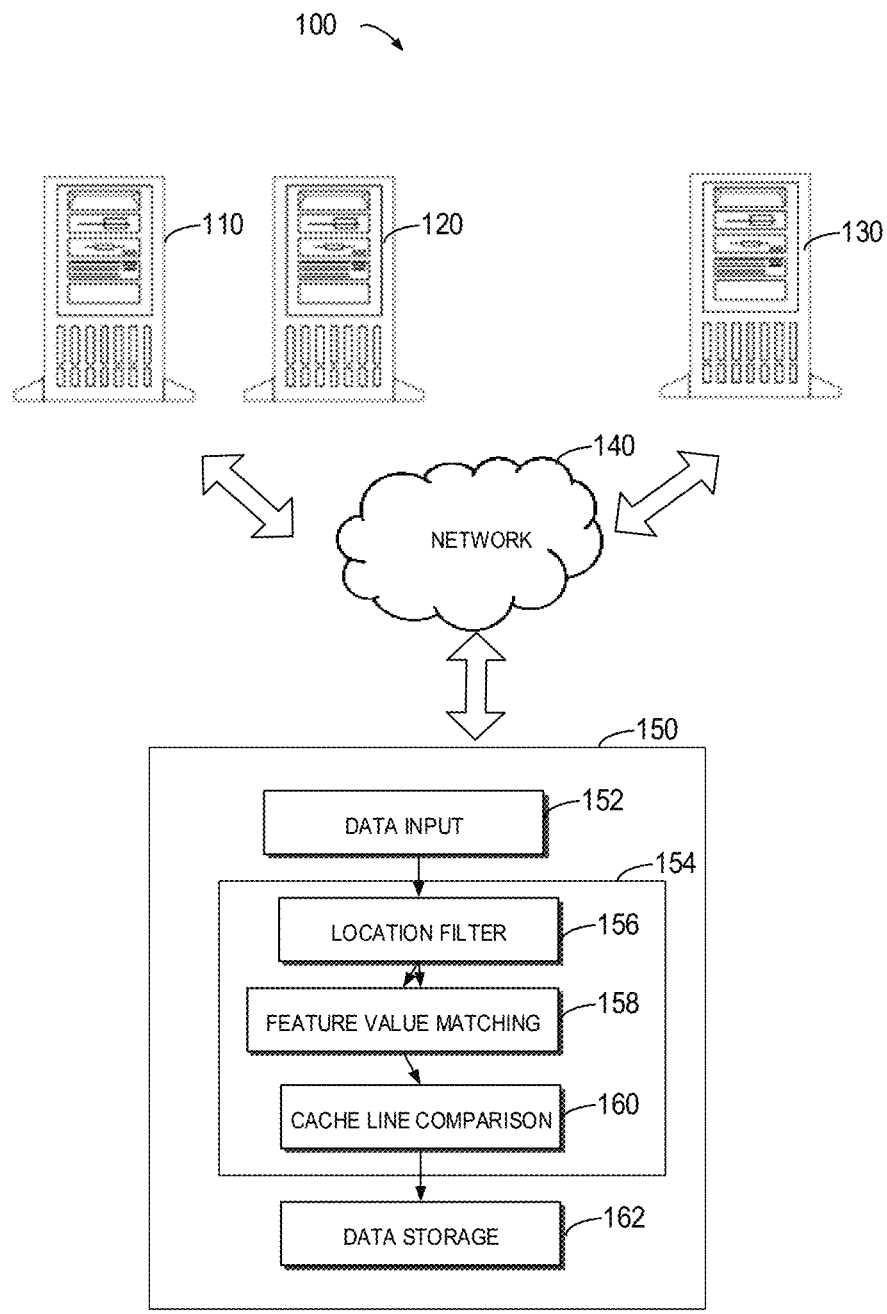
FIG. 1 illustrates a diagram of architecture of a system 100 for determining duplicated data in which implementations of the subject matter described herein can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail with reference to figures. Although the figures show preferred embodiments of the present disclosure, it should be appreciated that the present disclosure may be implemented in various forms and should not be limited by embodiments described here. On the contrary, these embodiments are provided to make the present disclosure more transparent and complete and convey the scope of the present disclosure completely to those skilled in the art.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As stated above, a conventional method of determining duplicated data is directly determining whether input data is a duplicated data of an already-existing pattern for example by comparing the obtained input data with reference data corresponding to the already-existing pattern in a database cache line by cache line. Since the conventional method of determining the duplicated data is compare each to-be-recognized input data directly with each of a plurality of reference data in the database in turn as per cache line, its computing quantity is considerable, and meanwhile it is impossible to recognize duplicated data quickly. Particularly for an application scenario for processing massive information, for example for a large-sized search engine of internet information, using the conventional method of determining duplicated data to recognize massive webpage data will consume amazing computing resources, which will cause the system to be encumbered obviously.

To sum up, drawbacks existing in the conventional method of determining duplicated data at least include: a lower efficiency of recognizing duplicated data, larger consumption of storage and computing resources, and inadaption for recognition of massive data. To at least partly solve one or more of the above problems and other potential problems, example embodiments of the present disclosure provide a solution of determining duplicated data. In this solution, first, compare whether data at a first position in input data is the same as predetermined data; then determine whether a feature value of a selected portion of the input data matches with an already-existing duplicated data pattern in a duplicated data pattern list; when the feature value matches with the duplicated data pattern, determine an association of the input data with reference data which is associated by the matched pattern. In this solution, first, it is feasible to quickly filter away a considerable proportion of input data which is obviously not duplicated data of the already-existing mode by determining whether the data at the first position in the input data is the same as the predetermined data, then determine whether the feature value of the selected portion of the input data is matched with the already-existing duplicated data pattern to efficiently select input data matched with the feature of the already-existing pattern, and then compare the input data matched with the feature with corresponding reference data to accurately determine an association between the to-be-recognized input data and the reference data. In other words, according to the solution of the present disclosure, it is feasible to quickly filter away the input data which is obviously not duplicated data by comparison with data at main positions of the input data, then quickly filter away input data unmatched with the already-existing pattern by comparison with the feature value of the selected region of the input data, and then precisely determine relevancy by comparing limited matched input data with corresponding reference data. Obviously, in the solution of the present disclosure, the input data which is obviously not duplicated data is already efficiently filtered away through the comparison at the above two layers, comparison between candidate input data entering a third layer and corresponding reference data only needs to be performed for partial input data which is matched with the already-existing pattern, and a comparison object is association sample data already determined according to a matching relationship. Since it is necessary to compare each input data with each sample data in the database, the solution according to the present disclosure can effectively reduce consumption of the computing resources (e.g., increase processing efficiency).

FIG. 1 illustrates a diagram of architecture of a system 100 for determining (or detecting) duplicated data in which implementations of the subject matter described herein can be implemented. It should be appreciated that the structure and function of the system 100 as shown in FIG. 1 are only used for illustration purpose, and do not imply any limitation of the scope of the present disclosure. Embodiments of the present disclosure may be embodied in different structures and/or functions.

As shown in FIG. 1, the system 100 includes a plurality of servers (or host computers), for example designated by 110, 120. The system 100 further includes a duplicated data-determining (or a duplicated data-detecting) apparatus 150 (e.g., specialized circuitry of a data storage array or other data storage equipment). The servers are connected with the duplicated data-determining apparatus 150 via a network 140. The duplicated data-determining apparatus 150 is configured to recognize duplicated data in input data through duplicated data-determining software which runs on the apparatus. In some embodiments, the input data comes from the network, for example, webpage data. The duplicated data-determining apparatus 150 is for example used to recognize duplicated data in webpage data obtained by a web crawler, to save the storage and computing resources for the webpage data.

As shown in FIG. 1, the duplicated data-determining apparatus 150 further includes a data-inputting module (or circuit) 152, a duplicated data-determining module (or circuit) 154, and a data-storing module (or circuit) 162, wherein the data-inputting module 152 is configured to receive input data, and further send the input data to the duplicated data-determining module 154. The duplicated data-determining module 154 is used to recognize (or ascertain) whether the input data is the duplicated data of the already-existing pattern. The data-storing module 162 is configured to store data based on a recognition result of the duplicated data-determining module 154.

The duplicated data-determining module 154 further includes a position filter module (or circuit) 156, a feature value matching module (or circuit) 158 and a cache line comparing module 160. The position filter module 156 is configured to filter away input data that is not duplicated data, according to the comparison between data at the first position in the input data and predetermined data. In some embodiments, the position filter module 156 may include a one-layer filter comparison means (or circuit), for example, a filter comparison circuit between the data at the first position in the input data and the predetermined data. In some embodiments, the position filter module 156 may include two-layer of filter comparison means (or circuit). For example, it is feasible to first perform filter comparison between data at the first position and data at the second position in the input data; then, with respect to input data not filtered away, perform filter comparison between the data at the first position and the predetermined data.

The feature value matching module 158 is configured to select candidate input data according to whether the feature value of the selected portion of the input data is matched with the already-existing duplicated data pattern.

The cache line comparing module 160 is configured to determine association of the candidate input data with reference data associated by the matched pattern.

In embodiments of the present disclosure, most input data that is obviously not duplicated data is already efficiently filtered away by the position filter module 156 and the feature value matching module 158, so that the cache line comparing module 160 only needs to perform comparison for a small amount of candidate input data and the matched associated reference data, without performing comparison for each input data and each reference data in the database one by one. Therefore, it is possible to effectively reduce consumption of the computing resources, and improve the recognition efficiency of the duplicated data.

Figure 2:
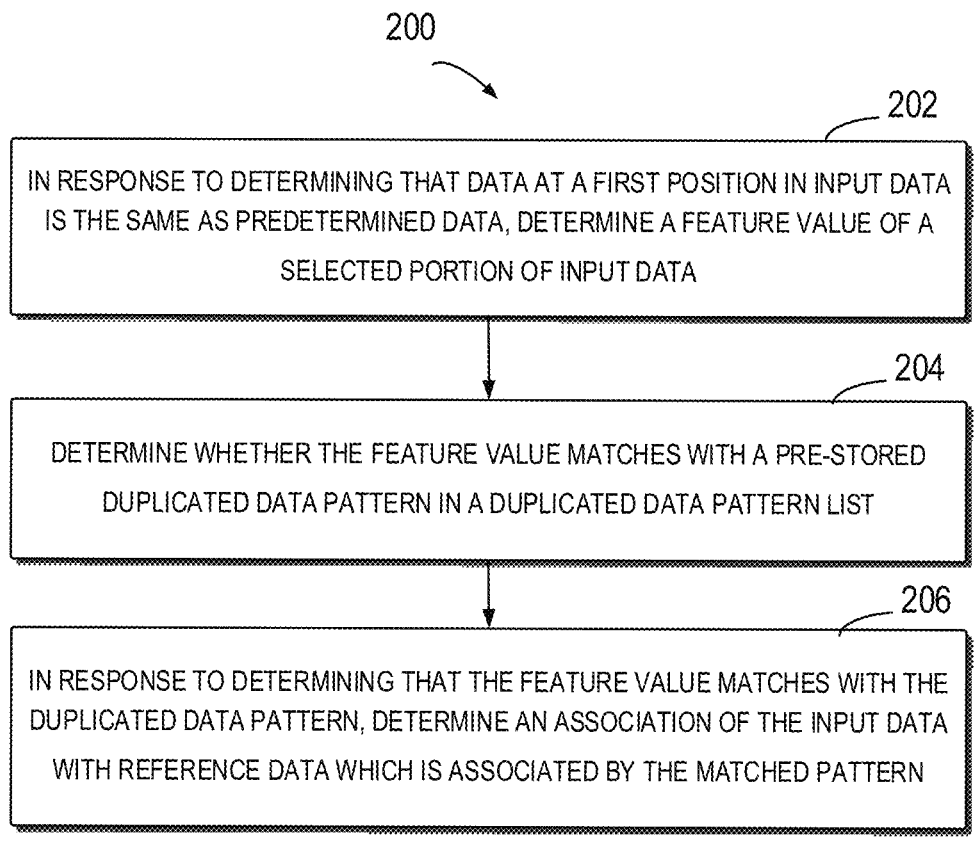
FIG. 2 illustrates a flow chart of a method 200 for determining duplicated data according to an implementation of the subject matter described herein.

FIG. 2 illustrates a flow chart of a method 200 for determining (or identifying) duplicated data according to an implementation of the subject matter described herein. In the embodiment as shown in FIG. 2, acts are for example executed by a processor (e.g., processing circuitry executing specialized code to form specialized circuitry). The method 200 may further include additional acts not shown and/or shown acts may be omitted. The scope of the present disclosure is not limited in this aspect.

At block 202, in response to determining that data at a first position in input data is the same as predetermined data, specialized circuitry determines the feature value of the selected portion of the input data. In some embodiments, if a data of a starting portion in to-be-recognized input data is the same as the predetermined data, the feature value of the selected portion (e.g., eight bytes of data in the starting portion) of the input data is determined. In some embodiments, the feature value is for example not limited to a hash value obtained by calculating based on eight bytes of the data of the starting portion of the input data. Preferably, a reason for calculating the hash value based on the eight bytes of the starting portion of the input data is for example that some systems usually only support recognition and determination of eight bytes of duplicated data.

Regarding the predetermined data, in some embodiments, the predetermined data is determined based on data at a plurality of prime number locations of the input data. The reason for determining the predetermined data based on the prime number locations mainly lies in that the calculation data locations are usually not prime number during data generation. Therefore, if the predetermined data determined based on a plurality of prime number locations is the same as the data at the first position, this indicates that a probability that the input is duplicated data is relatively high. This manner of determining the predetermined data can very efficiently filter away input data that is not duplicated date. In some embodiments, the plurality of prime number locations are determined based on the prime number locations that are respectively adjacent to a plurality of equidistant locations between the starting portion of the input data and an ending portion. For example, a length of the input data is 10K, for example, four prime number locations that are respectively adjacent to equidistant locations 2k, 4k, 6k, 8k are selected and determined as the abovementioned plurality of prime number locations. Selection of the prime number locations adjacent to the equidistant locations is mainly determined by consideration based on statistics law of a lot of duplicated data and probability distribution characteristics. In some embodiments, the number of prime number locations may be determined according to actual situations, for example, determined as smaller than 8, for example 2 or 4.

Figure 3:
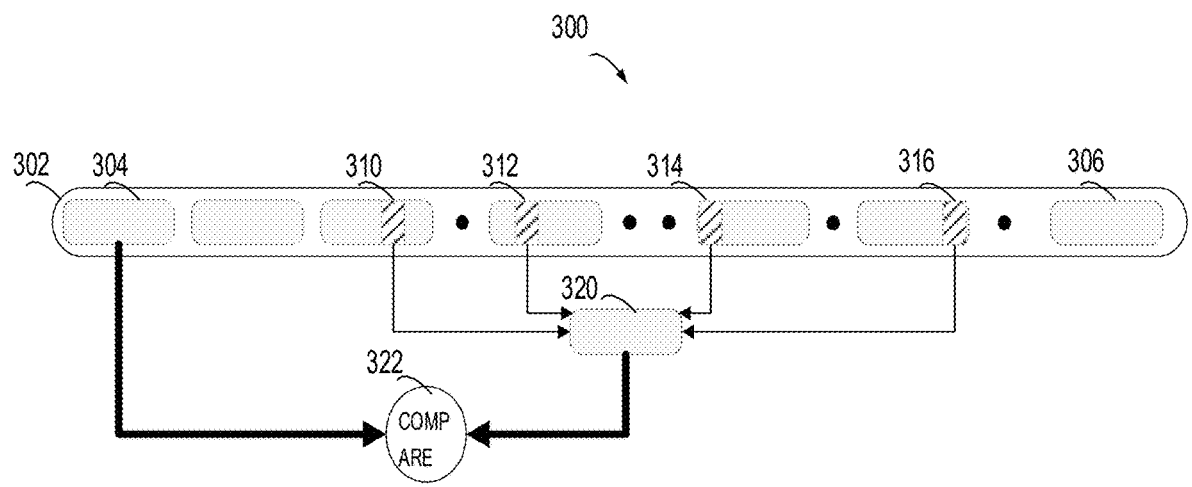
FIG. 3 illustrates a schematic diagram of a method 300 of comparing data at a first position and a predetermined data according to an implementation of the subject matter described herein.

FIG. 3 illustrates a schematic diagram of a method 300 of comparing data at a first position and predetermined data according to an implementation of the subject matter described herein. In the embodiment shown in FIG. 3, four prime number locations, namely, 310, 312, 314 and 316, are selected between the starting portion 304 and the ending portion 306 of the input data 302, two bytes of data are obtained from each prime number location, and then the eight bytes are combined into an 8-byte predetermined data 320. Then, specialized circuitry determines whether data at the starting portion 304 in the input data 302 and the predetermined data 320 are the same, as shown in 322. If they are the same, the hash value is calculated based on the eight bytes of data of the starting portion 304.

In some embodiments, in response to the data at the first position being the same as the data at the second position in the input data, specialized circuitry determines whether the data at the first position is the same as the predetermined data. That is, before determining whether the data at the first position is the same as the predetermined data, it is also feasible to first compare whether the data at the first position in the input data is the same as the data at the second position, and if they are the same, further determine whether the data at the first position is the same as the predetermined data. A purpose of using the above means is to, before using the filter manner of comparing with the predetermined data, use a filter manner of comparing data at the first position and data at the second position in the input data to quickly filter away a considerable portion of input data that is obviously not duplicated data. A main reason for this is that it is found from statistics and studies that duplicated data usually means that the same data appears repeatedly at a plurality of positions. In other words, the input data that is not duplicated data can be filtered away more effectively by setting two layers of comparison. The above means may be understood as an instantiation and optimism of a Bloom filter principle in the duplicated data determining method as a specific application scenario.

Figure 4:
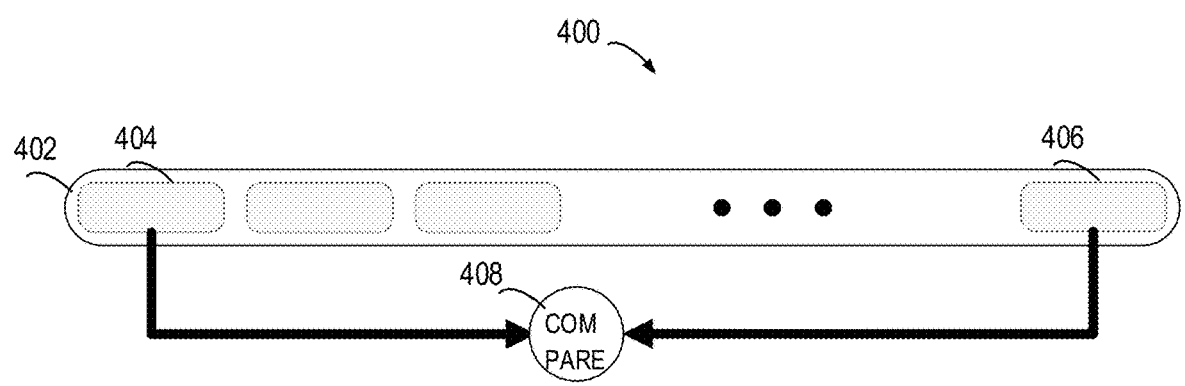
FIG. 4 illustrates a schematic diagram of a method 400 of comparing data at a first position and a data at a second position according to an implementation of the subject matter described herein.

FIG. 4 illustrates a schematic diagram of a method 400 of comparing data at a first position and data at a second position according to an implementation of the subject matter described herein. In some embodiments, the data at the first position is the starting portion of the input data, and the data at the second position is the ending portion of the input data. It is found from studies that the starting portion and ending portion of the duplicated data are usually the same, so it is feasible to quickly filter away the input data that is obviously not duplicated data by comparing whether the starting portion and ending portion of the input data itself are the same, thereby improving the efficiency of recognizing the duplicated data. As shown in FIG. 4, eight bytes of data are respectively selected at the starting portion 404 and ending portion 406 in the input data 402, and comparison is performed as to whether the selected two eight bytes of data are the same, as shown in FIG. 408. If the two are the same, this indicates that the input data might be duplicated data; it is necessary to further compare whether the starting portion 404 is the same as the predetermined data. This comparison with the predetermined data is for example as shown in FIG. 3. In the above embodiment, it is feasible to first determine whether the data at the starting portion and the ending portion in the input data are the same to filter away a portion of input data that is not duplicated data, if they are the same, further determine whether the predetermined data combined by the plurality of prime number locations is the same as the starting portion, to further filter away another portion of input data that is not duplicated data, so that what enters the subsequent recognizing or determining step is only partial input data that might be potential duplicated data. Actual test data prove that more than 90% input data that is not duplicated data may be filtered away by employing the above two layers of filter comparison, so only a small amount of (e.g., less than 10%) potential duplicated data enters the subsequent recognizing step. Therefore, the two layers of filter comparison means (or circuit) in the solution of the present disclosure can more effectively improve the efficiency of recognizing duplicated data, and reduce the consumption of the computing resources.

At block 204, specialized circuitry determines whether the feature value matches with a pre-stored duplicated data pattern in a duplicated data pattern list. In some embodiments, the duplicated data pattern list is construed by a hash list, wherein many already-existing duplicated data patterns are preset. Each already-existing duplicated data pattern has its own associated reference data. For example, it is possible to select the reference data corresponding to the already-existing duplication data pattern as independent variables, and regard the calculated value as a storage address of the reference data in the hash list through a certain function relationship (namely, a hash function). The duplicated data pattern list in the form of a hash list is large enough, and can effectively avoid the phenomenon of conflict that the value calculated based on different reference data corresponds to the same storage position in the hash list. In some embodiments, it is possible to query in the duly-formed duplicated data pattern list in the form of the hash list to find whether there is an already-existing duplicated data pattern matched with the hash value of the candidate input data. It is possible, through the above determining means (or circuit), to quickly filter away input data not matched with the already-existing duplicated data pattern, and then quickly select candidate input data matched with the already-existing duplicated data pattern.

At block 206, in response to determining that the feature value is matched with the duplicated data pattern, specialized circuitry determines an association of the input data with reference data which is associated with the matched pattern. In some embodiments, the determining association of the input data with reference data includes: determining, from the input data, a plurality of first data portions having a predetermined length; determining, based on the reference data, a plurality of second data portions having a predetermined length; determining the association of the input data and the reference data based on comparison of the plurality of first data portions and the plurality of second data portions. In the solution of the present disclosure, the input data that is obviously not duplicated data is already effi-ciently filtered away after the two layers of comparison at block 202 and block 204, so that the comparison between the input data and corresponding reference data at block 206 only needs to be performed for a small amount of input data and the matched associated reference data, without performing comparison for each input data and each reference data in the database one to one. Actual test data indicate that after comparison of two sequential layers at block 202 and block 204, the input data entering the block 206 and comparing with the reference data only occupy 4% of all input data. Through the comparison between the input data and the reference data associated by the matched pattern, about 2% data is determined as being associated with the reference data, and 2% data is determined as being irrelevant to the reference data. Therefore, the solution of the present disclosure can effectively reduce consumption of the computing resources (e.g., processing cycles may be reclaimed provide other computerized services and/or perform other operations).

Figure 5:
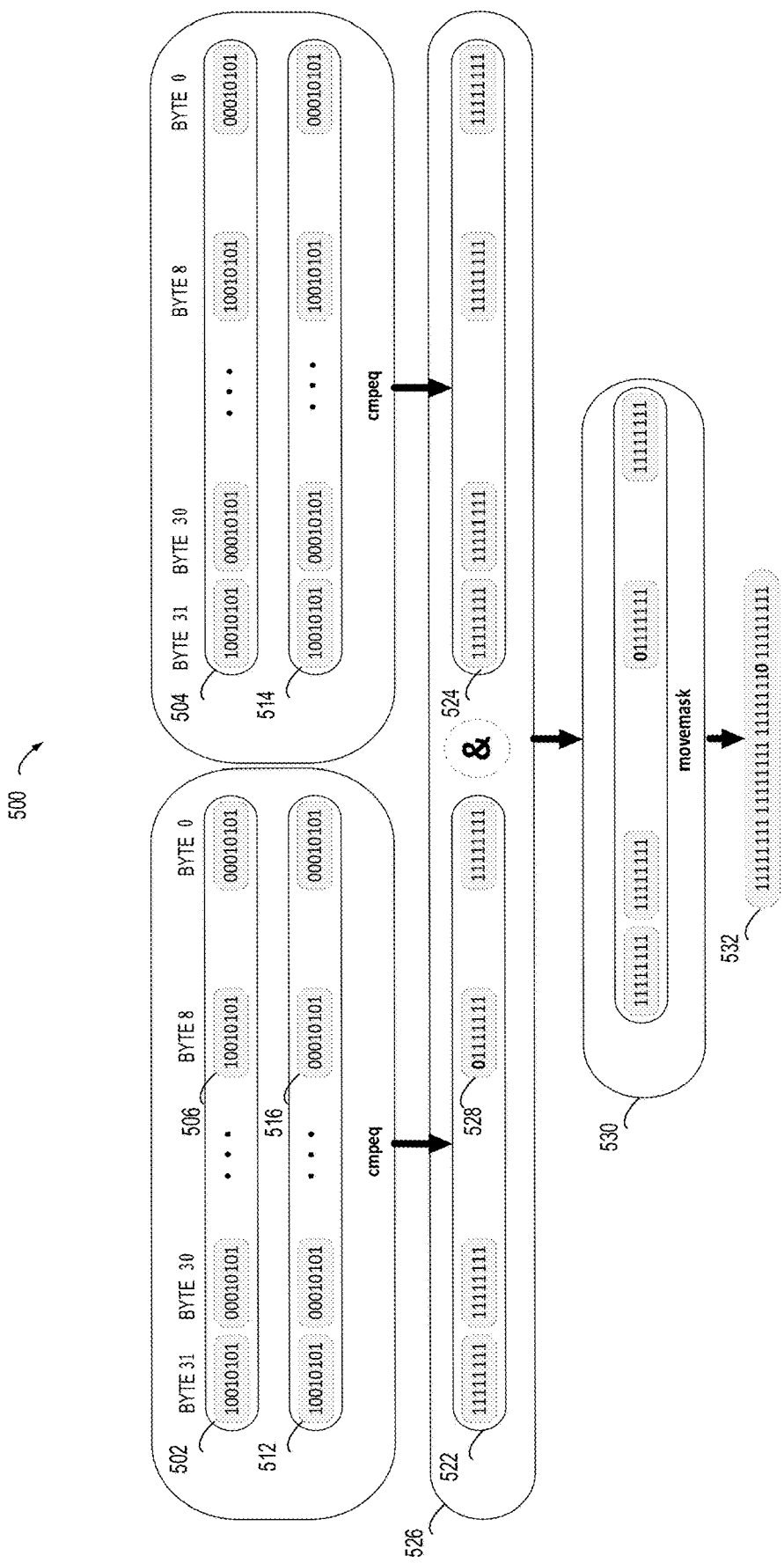
FIG. 5 illustrates a schematic diagram of a method 500 of comparing a first data portion and a second data portion according to an implementation of the subject matter described herein.

FIG. 5 illustrates a schematic diagram of a method 500 of comparing a first data portion and a second data portion according to an implementation of the subject matter described herein. In the embodiment shown in FIG. 5, for example it is feasible to select, from the input data, the plurality of first data portions having a predetermined length, for example, select 64 bytes from the input data, and divide them into two 32-byte data 502 and 504. It is feasible to determine, based on the reference data associated with the matched duplicated data pattern, the plurality of second data portions having a predetermined length, for example, determine two 32-byte data 512 and 514 based on the reference data. Then, it is feasible to compare the data 502 with data 512 bit by bit and generate a first comparison result 522, and meanwhile compare the data 504 with data 512 bit by bit and generate a second comparison result 524. For example, during bit-by-bit comparison of the data 502 and data 512, data 506 and 516 having 8 bytes is different at one bit, and then the data 528 with 8 bytes in the first comparison result 522 indicates the difference of the bit. Then, it is feasible to perform AND operation for the first comparison result 522 and the second comparison result 524, as shown at 526, then perform a movemask instruction operation as shown at 530, to precisely determine the association of the candidate input data and the reference data and generate a relevancy comparison result 532. The relevancy comparison result 530 is used to indicate the relevancy between the compared input data and reference data. In some embodiments, bit-by-bit comparison of the above two groups of 32 bytes may be implemented with a vector instruction 'cmpeq' of Intel Corporation. Since the method of determining the duplicated data according to the present disclosure employs the bit-by-bit comparison of two groups of 32 bytes, it can further improve the efficiency and speed of recognizing duplicated data as compared with a conventional solution of determining the duplicated data employing bit-by-bit comparison of eight bytes.

In some embodiments, the method 200 may further include: in response to the association indicating none association of the input data and the reference data, storing the input data. In some embodiments, when the input data and the reference data are determined associated, it is feasible not to perform actual write for the input data, but direct the input data to already-existing reference data in the database; when the input data and the reference data are determined not associated, it is feasible to write the input data. It is possible, through the above means, to effectively avoid repeated write of duplicated data which is identical with the already-existing pattern stored in the database, and then effectively save the storage resources and improve data write speed.

Figure 6:
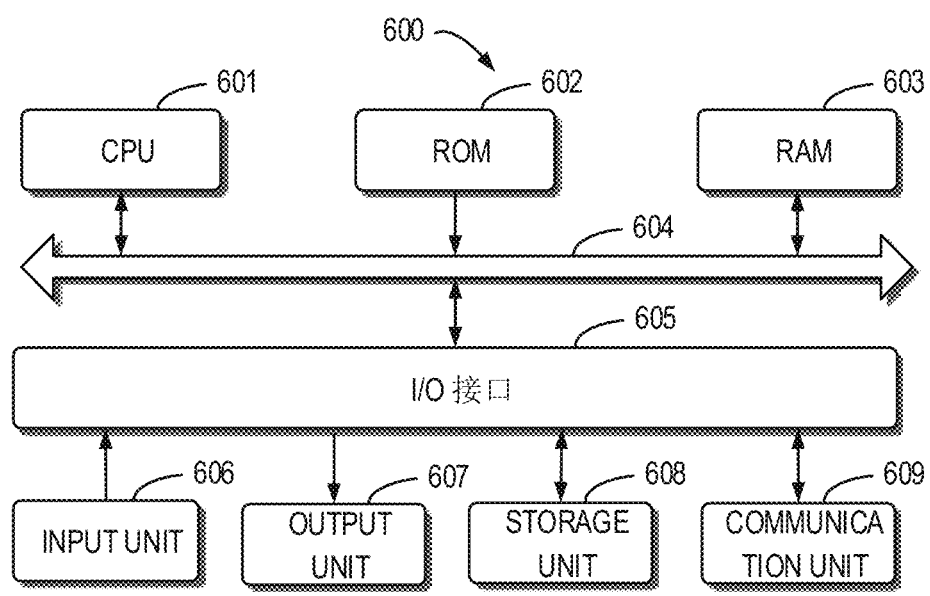
FIG. 6 illustrates a block diagram of an electronic device 600 adapted to implement an implementation of the subject matter described herein.

FIG. 6 illustrates a block diagram of an electronic device 600 adapted to implement an implementation of the subject matter described herein. The device 600 may be used to implement the system for executing the method 200 of determining duplicated data as shown in FIG. 1. As shown in FIG. 6, the device 600 includes a central processing unit (CPU) 601 which is capable of performing various actions and processes in accordance with a computer program instruction stored in a read only memory (ROM) 602 or a computer program instruction loaded from a storage unit 608 to a random access memory (RAM) 603. In the RAM 603 are stored various programs and data as required by operation of the device 600. The CPU 601, the ROM 602 and the RAM 603 are connected to one another via a bus 604. An input/output (I/O) interface 605 is also connected to the bus 604.

The following components of the device 600 are connected to the I/O interface 605: an input unit 606 including a keyboard, a mouse, or the like; an output unit 607 including various displays, loudspeakers and the like; the storage unit 608 such as a disk, an optical disk or the like; a communication unit 609 such as a network card, a modem, a wireless communication transceiver or the like. The communication unit 609 allows the device 600 to exchange information/data with other devices through a computer network such as the Internet and/or various telecommunication networks.

The processing unit 601 performs various methods and processing described above, for example, performs the method 200 of determining the duplicated data. For example, in some embodiments, the method 100 may be implemented as a computer software program, which is stored in a machine-readable medium, for example the storage unit 608. In some embodiments, part or all of the computer program may be loaded into and/or installed on the device 600 via the ROM 602 and/or communication unit 609. When the computer program is loaded to the RAM 603 and executed by the CPU 601, one or more operations of the method 100 described above may be performed. Alternatively, in other embodiments, the CPU 601 may be configured in any other proper manners (e.g., by virtue of a firmware) to perform one or more actions of the method 100.

It needs to be further appreciated that the present disclosure may be a method, an apparatus, a system and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The depictions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What are described are only preferred embodiments of the present disclosure, and not intended to limit the present disclosure. Those skilled in the art appreciate that the present disclosure may have various modifications and variations. Any modifications, equivalent substitutes and improvements within the spirit and principles of the present disclosure all fall within the protection scope of the present disclosure.

We claim:

1. A method of determining duplicated data, comprising:
   in a first layer of comparison, determining that a first data portion of input data is the same as data from a plurality of predetermined locations of the input data;
   in response to determining that the first data portion of the input data is the same as the data from the plurality of predetermined locations of the input data, determining a feature value of the first data portion of the input data;
   in a second layer of comparison, determining that the feature value of the first data portion of the input data is matched with a pre-stored duplicated data pattern in a duplicated data pattern list;
   in response to determining that the feature value of the first data portion of the input data is matched with the pre-stored duplicated data pattern in the duplicated data pattern list, determining an association of the first data portion with corresponding reference data associated with the pre-stored duplicated data pattern;
   in a third layer of comparison, determining that the association indicates that the first data portion is not associated with the corresponding reference data; and
   in response to determining that the association indicates that the first data portion is not associated with the corresponding reference data, storing the input data.

2. The method according to claim 1, wherein the plurality of predetermined locations are adjacent to a plurality of equidistant locations between a starting portion and an ending portion of the input data, respectively.

3. The method according to claim 1, wherein the data from the plurality of predetermined locations are based on combining data in a second number of bytes at each of a first number of the plurality of predetermined locations of the input data.

4. The method according to claim 1, wherein determining the association of the first data portion with the corresponding reference data comprises:
   determining, from the first data portion, a plurality of data portions having a predetermined length;
   determining, based on the reference data, a plurality of second data portions having a predetermined length; and
   determining the association based on a comparison of the plurality of first data portions determined from the first data portion and the plurality of second data portions determined based on the reference data.

5. An apparatus for determining duplicated data, comprising:
   a memory configured to store one or more programs;
   a processing unit coupled to the memory and configured to execute the one or more programs to cause the apparatus to perform acts comprising:
   in a first layer of comparison, determining that a first data portion of input data is the same as data from a plurality of predetermined locations of the input data;
   in response to determining that the first data portion of the input data is the same as the data from the plurality of predetermined locations of the input data, determining a feature value of the first data portion of the input data;
   in a second layer of comparison, determining that the feature value of the first data portion of the input data is matched with a pre-stored duplicated data pattern in a duplicated data pattern list;
   in response to determining that the feature value of the first data portion of the input data is matched with the pre-stored duplicated data pattern in the duplicated data pattern list, determining an association of the first data portion with corresponding reference data associated with the pre-stored duplicated data pattern;

in a third layer of comparison, determining that the association indicates that the first data portion is not associated with the corresponding reference data; and in response to determining that the association indicates that the first data portion is not associated with the corresponding reference data, storing the input data.

6. The apparatus according to claim 5, wherein the plurality of predetermined locations are adjacent to a plurality of equidistant locations between a starting portion and an ending portion of the input data, respectively.

7. The apparatus according to claim 5, wherein the data from the plurality of predetermined locations are based on combining data in a second number of bytes at each of a first number of the plurality of predetermined locations of the input data.

8. The apparatus according to claim 5, wherein determining the association of the first data portion with the corresponding reference data comprises:
- determining, from the first data portion, a plurality of data portions having a predetermined length;
- determining, based on the reference data, a plurality of second data portions having a predetermined length; and
- determining the association based on a comparison of the plurality of data portions determined from the first data portion and the plurality of second data portions determined based on the reference data.

9. A computer program product having a non-transitory computer readable medium that stores a set of instructions to detect duplicated data received by a data storage array; the set of instructions, when carried out by the data storage array, causing the data storage array to perform a method of:

in a first layer of comparison, determining that a first data portion of input data is the same as from a plurality of predetermined locations of the input data;

in response to determining that the first data portion of the input data is the same as the data from the plurality of predetermined locations of the input data, determining a feature value of the first data portion of the input data;

in a second layer of comparison, determining that the feature value of the first data portion of the input data is matched with a pre-stored duplicated data pattern in a duplicated data pattern list;

in response to determining that the feature value of the first data portion of the input data is matched with the pre-stored duplicated data pattern in the duplicated data pattern list, determining an association of the first data portion with corresponding reference data associated with the pre-stored duplicated data pattern;

in a third layer of comparison, determining that the association indicates that the first data portion is not associated with the corresponding reference data; and in response to determining that the association indicates that the first data portion is not associated with the corresponding reference data, storing the input data.

10. The computer program product of claim 9, further comprising:

in response to determining that the feature value of the first data portion of the input data is matched with the pre-stored duplicated data pattern in the duplicated data pattern list, applying reclaimed processing cycles to provide other computerized services.

\* \* \* \* \*